July 7, 1936.  D. K. HARALSON ET AL  2,046,681
SLICING MACHINE FOR BUNS, ROLLS AND THE LIKE
Filed April 24, 1935  2 Sheets-Sheet 1

Inventor
Dean K. Haralson
Charles H. McMillan
By
Attorney

July 7, 1936.  D. K. HARALSON ET AL  2,046,681

SLICING MACHINE FOR BUNS, ROLLS AND THE LIKE

Filed April 24, 1935  2 Sheets-Sheet 2

Inventor
Dean K. Haralson
Charles H. McMillan
By
Attorney

Patented July 7, 1936

2,046,681

UNITED STATES PATENT OFFICE 2,046,681

SLICING MACHINE FOR BUNS, ROLLS, AND THE LIKE

Dean K. Haralson and Charles H. McMillan, Oklahoma City, Okla.; said Haralson assignor to said McMillan Application April 24, 1935, Serial No. 18,066

5 Claims. (Cl. 146—73)

This invention is directed to a slicing machine for buns, rolls and the like wherein provision is made for utilizing centrifugal force for feeding the buns to the slicing blade and wherein selective provision permits complete or partial severance of the bun at will.

The invention is directed to a construction wherein the buns, rolls or the like are successively fed into the machine onto a relatively slowly revolving table and under the centrifugal force developed, the bun or roll is positioned with respect to an adjustable guide and carried past the slicing disk or knife for slicing and discharged. The adjustable guide determines the position of the bun or roll with respect to the slicing disk or knife to cause said disk or knife to cut entirely through the bun or roll, that is dividing it completely, or to cut partially through the bun or roll to provide connected halves of the bun or roll to maintain the bun or roll intact and yet sufficiently divided for easy handling in making up sandwiches and the like. The bun or roll in its travel past the knife or disk is held against vertical displacement relative to the knife or disk by a guide which is in itself adjustable to permit the bun or roll to be held against vertical displacement with respect to the revolving table and thus provide for convenient accommodation of buns or rolls of different thickness. The revolving knife or disk is provided for vertical adjustment with respect to the revolving table so that the buns or rolls may be divided into portions of unequal thickness, as may under some circumstances be desirable.

The invention is illustrated in the accompanying drawings, in which.

Figure 1:
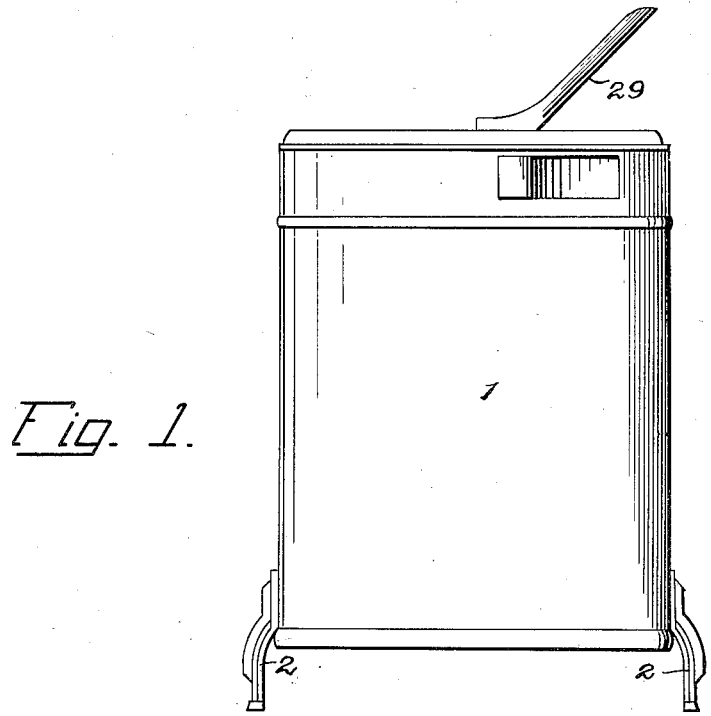
Figure 1 is a view in elevation of the complete machine.
Figure 2:
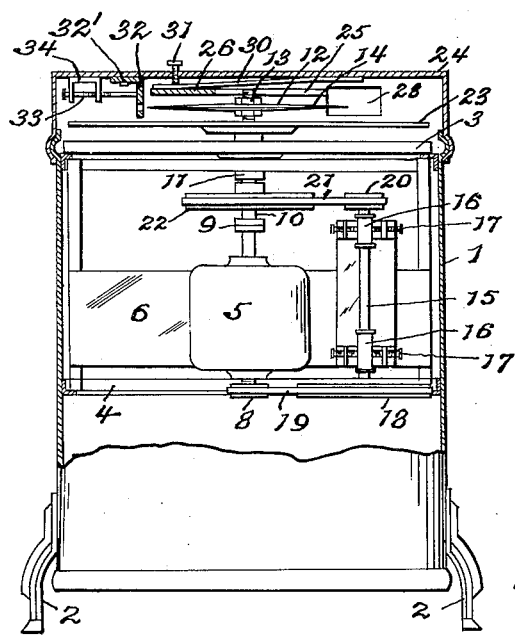
Figure 2 is a vertical sectional view, partly in elevation, of the same.
Figure 3:
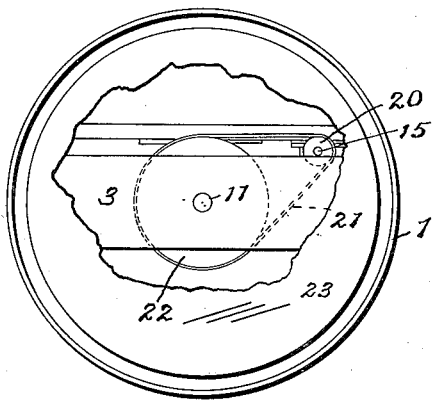
Figure 3 is a plan view of the machine with the cover and connected parts removed, the cutting disk being also removed.
Figure 4:
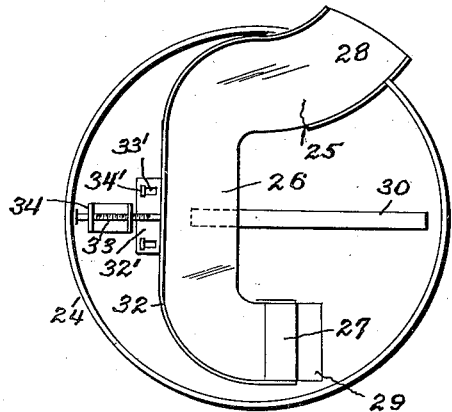
Figure 4 is a bottom plan view of the cover and parts carried thereby.
Figure 5:
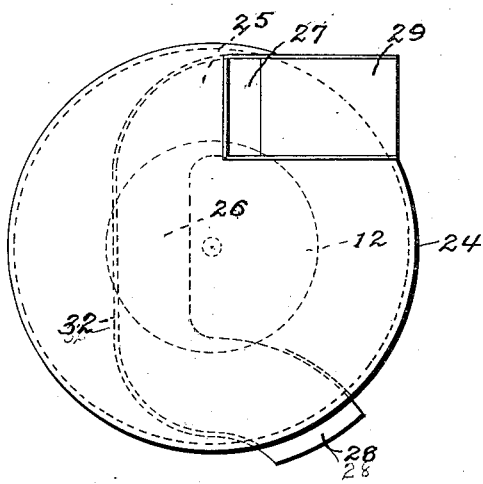
Figure 5 is a top plan view of the cover, the chutes being shown in dotted outline.
Figure 6:
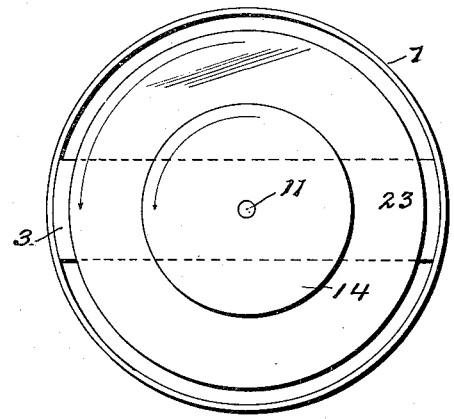
Figure 6 is a plan view of the machine with the cover removed, the cutting disk and revolving table being shown in position.

The improved apparatus comprises a circular hollow drum or casing 1 open at the upper end and appropriately supported on legs 2. Upper and lower transverse frame plates 3 and 4 are secured within the casing and a motor 5 is arranged between such frame plates on the vertical web 6 secured in the casing. The rotor shaft 7 of the motor is mounted in suitable bearings in the lower frame plate 4 and provided immediately below such frame plate with a belt wheel 8.

The rotor shaft above the motor is connected through a coupling 9 to a similar aligned shaft 10 which extends through a hollow shaft 11, which hollow shaft is revolubly supported in suitable bearings in the upper frame plate 3. The shaft 10 extends through and above the hollow shaft 11 and is threaded at the upper end to receive a supporting nut 12 and a clamping nut 13 between which on the shaft is secured a slicing knife in the form of a disk 14, the peripheral edge of which is appropriately formed for cutting.

Supported on the web to which the motor is secured and at one side of the motor is a shaft 15, the bearings 16 of which are adjustable in a conventional manner through set-screws 17 to provide for the tightening of the belt drive hereinafter referred to. The lower end of the shaft 15 is provided with a belt wheel 18 of materially greater diameter with respect to and arranged in alignment with the belt wheel 8 to permit driving connections between these belt wheels through a belt 19. The upper end of the shaft 15 is provided with a belt wheel 20 of materially smaller diameter than the belt wheel 18, which belt wheel 20 has driving connection through a belt 21 with a belt wheel 22 rigidly secured to the hollow shaft 11, thereby imparting motion to the shaft 11. Secured upon the upper end of the hollow shaft 11 is a revolving disk 23 which underlies and is of materially greater diameter than that of the slicing disk 14.

By the described arrangement, it will be apparent that the slicing disk is driven substantially at the speed of the motor, while the supporting table 23, owing to the selected sizes of the belt wheels referred to, is driven in the same direction but at a very materially reduced speed compared to that of the slicing disk. It is further apparent that by proper adjustment of the nuts 12 and 13, the space between the revolving table and the slicing disk may be adjusted to vary the thickness of the respective sections of the bun or roll operated upon, as will later more particularly appear.

The upper end of the casing 1 is to be closed by a cover 24, with the cover frictionally or otherwise removably secured in place. This cover is provided on the inner surface of its upper portion or top with guides for the bun or roll to be sliced, which guides together form a chute for the proper control of the bun or roll while passing through the machine. This chute comprises a section 25 made up as a flat wall having an intermediate part 26 which overlies the slicing disk 14 extending parallel to the diameter of the slicing disk and having a length slightly less than the diameter of such disk.

Beyond the part 26, the chute 25 is turned laterally to provide an inlet part 27 and a discharge part 28. The inlet part communicates with a feed chute 29 carried by the cover and extending outwardly therebeyond, the feed chute being inclined to provide for gravital feeding of the buns or rolls into the machine. The discharge part of the chute communicates with an opening leading through the side wall of the casing 1 for the convenient discharge of the sliced buns or rolls. The chute section 25 is secured at its ends to the cover, and is centrally supported by a leaf spring 30 secured at one end to the cover and at the opposite end to the central portion of the chute section 25, a set-screw 31 threaded in the cover engaging the chute section connected end of the spring to provide for vertical adjustment of this chute section 25 when desired.

The remaining part of the chute section within the machine is provided by a wall 32 which depends vertically from the cover and is secured at its ends to the cover and centrally by a plate 32' formed with slots 33' receiving screws 34' taking into the cover. The central portion of the wall 32 is moved by an adjusting screw 33 having threaded support in a bracket 34 secured to the cover. The wall 32 follows the outline of the chute section 25, and is positioned adjacent the outer edge of such section, being, as is obvious, adjustable transverse the section 25 through the operation of the adjusting screw 33. The wall 32 of the chute has its lower edge immediately above the slicing disk 14 and obviously, by proper operation of the adjusting screw 33, this wall may be positioned inwardly of the cutting edge of the disk 14, in order to permit such disk to slice entirely through the bun or roll, or the wall 32 may be positioned outwardly beyond the edge of the slicing disk to cause such disk to cut but partially through the bun or roll in order to divide the bun or roll and yet leave the parts of the bun or roll connected at the edge.

The buns or rolls are delivered to the feed chute and into the guide chute within the machine, being initially deposited upon the revolving table which immediately creates, through the natural centrifugal force, a tendency to force the bun or roll against the wall 32. The revolving table moves the bun or roll into contact with the slicing disk which, of course, cuts through the bun or roll, either completely or to the extent permitted, and under the influence of the slicing disk and revolving table, the sliced sections of the bun or roll are delivered by the table after passing beyond the slicing disk through the discharge part 28 of the guide chute.

If the buns or rolls being operated upon are to be completely severed, the wall 32 is adjusted through the medium of the screw 33 to a position inwardly of the operating plane of the peripheral edge of the slicing disk 14, so that such disk in operation will cut entirely through the buns or rolls. If, on the other hand, the buns or rolls are to be cut but partially through, leaving a sort of hinge formation at the outer edge, so that the two sections may be readily opened for placing a filling and yet the sections remain connected, the wall 32 is adjusted through the medium of the screw 33, so that it is outwardly beyond the peripheral cutting edge of the disk 14, so that the operative plane of the disk is such as to not extend completely through the bun or roll being operated upon.

Furthermore, by appropriate adjustment of the nuts 12 and 13, the slicing disk may be moved closer to or farther from the revolving table, within reasonable limits, to thereby cause the slicing disk to divide the bun or roll unequally with respect to the thickness of the respective parts. Thus, the upper or lower part of the bun or roll so severed may be thicker than the other by appropriate adjustment of the operating plane of the slicing disk with respect to the operating plane of the revolving table.

Of course, the chute will accommodate buns and rolls of different sizes, thus taking care of the long narrow oblong rolls as well as sandwich buns or rolls of any size, this being largely incident to the fact that the centrifugal force imparted to the bun or roll passing through the machine by the revolving table causes such bun or roll, regardless of its size, length or thickness, to be held under appreciable pressure against the wall 32 of the chute, thus causing the article, whatever may be its form or size, to be accurately presented to the slicing disk for slicing.

The primary feature of the present invention is the utilization of a revolving table arranged below the slicing disk and forming a support for the buns or rolls to be sliced. This table travels at a speed very much less than that of the slicing disk and of course is such diameter relative to that of the slicing disk as to form a support for the bun or roll during the entire travel of the bun or roll through the machine. This revolving table naturally creates a centrifugal force to compel the buns or rolls to move outwardly relative to such table to the degree permitted by the wall 32 and this force remains constant as a feeding force for the buns or rolls during their travel through the machine and particularly during their travel within the operating plane of the slicing disk. The revolving table, owing to its relatively larger diameter than that of the slicing disk, initially receives and carries the buns or rolls before they reach the operating plane of the slicing disk and receives and carries the sliced buns or rolls after they leave the operating plane of the slicing disk. The adjustment provided permits slicing the bun or roll in unequal proportions through vertical adjustment of the slicing disk and dividing them completely or partially as may be desired in the particular instance.

The mechanism is self-contained, driven from a single motor and the driving parts, while of conventional construction, are simple, sturdy and entirely practical in use and operation.

What is claimed to be new is:

1. A slicing machine for buns, rolls and the like, including a revolving table to which the articles are fed, means for revolving the table to exert a sufficient force on the articles thereon to compel the articles to move on the table under said force, a revolving cutting disk operating above and concentric with the table, a wall overlying the table and extending above and below the operative plane of the cutting disk to define the path of travel of the articles past the cutting disk, feeding means for guiding the articles to be sliced onto the table beyond the influence of the cutting disk and within the area defined by the wall to thereby cause the centrifugal force exerted by the movement of the table on said articles to move the articles into contact with the wall in position to be operated on by the cutting disk, and delivery means for guiding the articles after operation thereon by the cutting disk for delivery beyond the influence of the table, said delivery means receiving the articles under the centrifugal force of the table.

2. A slicing machine for buns, rolls and the like, including a revolving table to which the articles are fed, means for revolving the table to exert a sufficient force on the articles thereon to compel the articles to move on the table under said force, a revolving cutting disk operating above and concentric with the table, a wall overlying the table and extending above and below the operative plane of the cutting disk to define the path of travel of the articles past the cutting disk, feeding means for guiding the articles to be sliced onto the table beyond the influence of the cutting disk and within the area defined by the wall to thereby cause the centrifugal force exerted by the movement of the table on said articles to move the articles into contact with the wall in position to be operated on by the cutting disk, and delivery means for guiding the articles after operation thereon by the cutting disk for delivery beyond the influence of the table, said delivery means receiving the articles under the centrifugal force of the table, said wall being extended to define the path of the articles after operation of the cutting disk and while under the influence of the centrifugal force of the table until said articles have reached the delivery means.

3. A slicing machine for buns, rolls and the like, including a revolving table to which the articles are fed and by means of which they are subjected to centrifugal force, a revolving cutting disk operating above and concentric with the table and in the path of movement of the articles under the influence of the table, and a wall positioned above the table and adjacent the cutting disk to limit the position of the articles in their movement under the centrifugal force of the table and defining the path of movement of the articles to and past the cutting disk.

4. A slicing machine for buns, rolls and the like, including a revolving table to which the articles are fed and by means of which they are subjected to centrifugal force, a revolving cutting disk operating above and concentric with the table and in the path of movement of the articles under the influence of the table, a wall positioned above the table and adjacent the cutting disk to limit the position of the articles in their movement under the centrifugal force of the table and defining the path of movement of the articles to and past the cutting disk, and means for adjusting the wall relative to the path of movement of the cutting disk to determine the width of cut of the disk with respect to the articles, whereby the articles may be cut entirely through or partially through as desired.

5. A slicing machine for buns, rolls and the like, including a revolving table to which the articles are fed, means for revolving the table at a speed to compel the articles to move under the developed centrifugal force while on the table, a revolving cutting disk operating above and concentric with the table, a feed chute for delivering the articles onto the table, a discharge chute for the delivery of the sliced articles beyond the table, and a wall positioned above the table and adjacent the cutting disk, the ends of said wall being fixed with respect to the delivery chute of the discharge chute to cause the wall to define a path from the delivery chute to the discharge chute and past the cutting disk, the intermediate portion of the wall being adjustable toward and from the cutting disk to determine the cutting depth of said disk in the articles.

DEAN K. HARALSON.
CHARLES H. McMILLAN.